Jan. 13, 1959 W. T. SELSTED 2,868,470

MAGNETIC TAPE APPARATUS

Filed May 26, 1955 2 Sheets-Sheet 1

INVENTOR.
WALTER T. SELSTED

BY

ATTORNEYS

Jan. 13, 1959

W. T. SELSTED 2,868,470

MAGNETIC TAPE APPARATUS

Filed May 26, 1955

2 Sheets-Sheet 2

INVENTOR.
WALTER T. SELSTED

BY [signature]

ATTORNEYS

United States Patent Office 2,868,470

Patented Jan. 13, 1959

2,868,470

MAGNETIC TAPE APPARATUS

Walter T. Selsted, Redwood City, Calif., assignor to Ampex Corporation, Redwood City, Calif., a corporation of California Application May 26, 1955, Serial No. 511,178

4 Claims. (Cl. 242—55.12)

This invention relates generally to magnetic tape apparatus of the type employed for recording and/or reproducing sound or other recordable frequencies. More particularly it pertains to braking means used in connection with the turntables for supporting the supply and takeup reels.

In apparatus of the above character it is important under certain operating conditions to apply predetermined braking torques to the turntables. Assuming that separate driving motors are connected to the turntables, and that a third motor rotates the driving capstan, when power is removed from these motors it is important to maintain tape tension by the application of proper braking torques. This condition arises after a fast forward movement of the tape, or at the conclusion of a rewind operation. The braking torques must be applied in such a manner that the braking of the trailing turntable, that is the turntable from which the tape is being removed, exceeds that of the leading turntable. However the difference should not be sufficiently great as to cause tape breakage or deformation.

In general it is an object of the present invention to provide braking means for magnetic tape apparatus which will apply the necessary braking torques in an effective manner, without causing tape breakage or deformation.

Another object of the invention is to provide braking means of the above character which is simple in mechanical construction, and which can be controlled by a single solenoid or like operating means.

Another object of the invention is to provide braking means of the above character which is self deenergizing or self relieving in its action, and which is independent of variations in coefficient of friction.

Additional objects and features of the invention will appear from the following descriptions in which the preferred embodiment has been set forth in detail in conjunction with the accompanying drawing.

Referring to the drawing.

Figure 1:
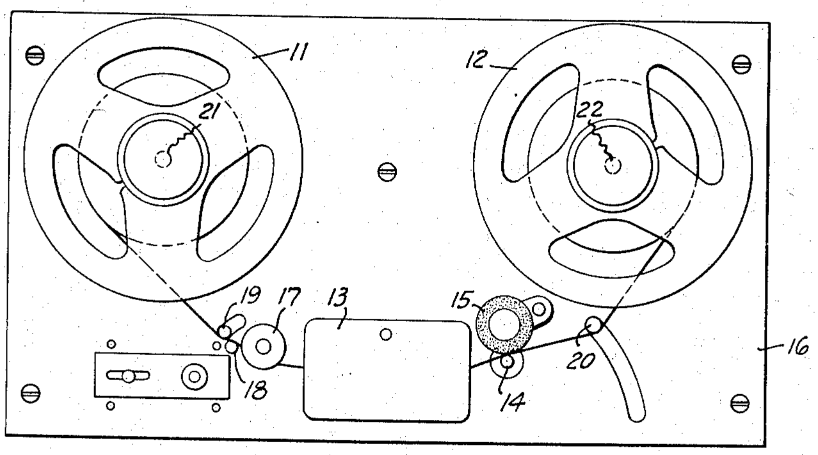
Figure 1 is a top plan view showing a magnetic tape apparatus of the type with which the present invention can be employed.

In Figure 1 of the drawing we have schematically illustrated a magnetic tape apparatus consisting of supply and takeup turntables 11 and 12, which are adapted to mount the conventional supply and takeup reels. The length of tape extending between the turntables is adapted to move across the magnetic head assembly 13, which can consist of record and playback transducer units, and the customary erase unit. The tape is engaged by the driving capstan 14, against which the tape is pressed by the idler roller 15. Generally the parts schematically illustrated in Figure 1 are mounted upon a panel 16, on the other side of which are other parts of the apparatus, including the electrical motors (not shown) for driving the turntables and the capstan 14. Additional tape engaging parts may include the guide assembly 17, compliance pin and arm 18, 19 and safety switch arm 20.

Figure 2:
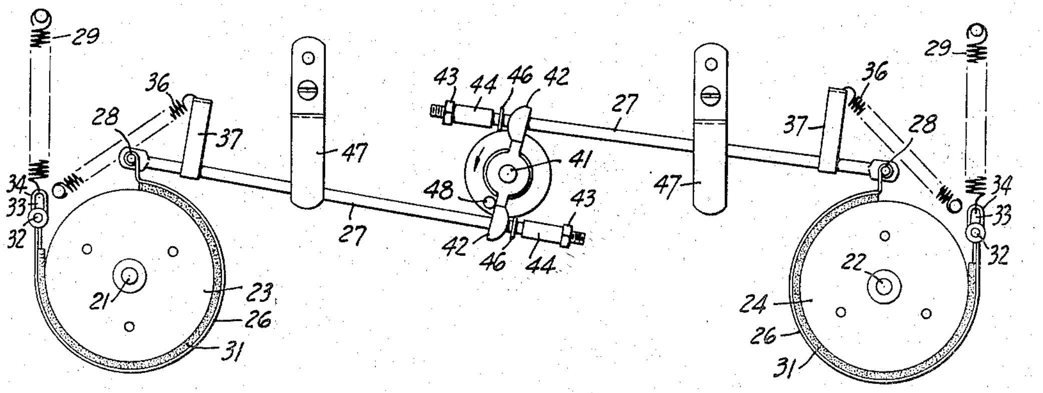
Figure 2 is a bottom plan view, with exaggerated spacing between the shafts, showing braking means for the turntables. In taking this view it is assumed that Figure 1 is rotated on a longitudinal axis with the upper part of the view swinging forwardly and downwardly.
Figure 3:
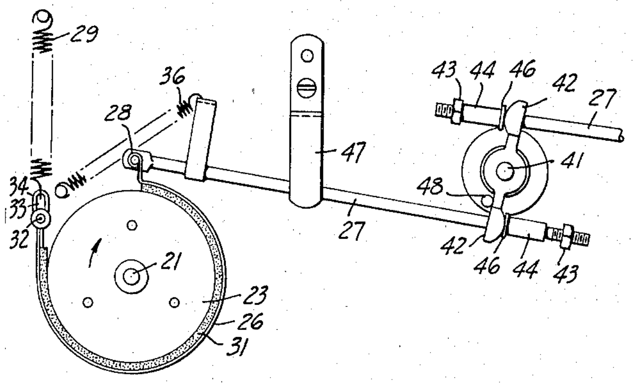
Figure 3 is a view showing braking action for the supply turntable at the end of a rewind operation.

The braking means used with the turntables is shown in Figure 2. It is assumed that the shafts 21 and 22 are the shafts which carry the turntables 11 and 12. These shafts also operatively connect with the turntable or driving motors (not shown). Braking wheels or drums 23 and 24 are carried by the shafts 21 and 22, and provide peripheral surfaces that are engaged by the brake bands 26. The brake bands and the means connected to the same are the same for each of the turntables. Each arrangement includes an operating rod 27, having its one end provided with a pivotal connection 28 to the adjacent end of the brake band. The other end of the band is attached to the tension spring 29, which has its one end anchored to a fixed support. The brake band is provided with a lining 31 of suitable material, such as asbestos cloth, for frictionally engaging the peripheral surface of the drum 23.

Means is provided for permitting limited freedom of movement for that end of the brake band attached to the spring 29. This means can consist of a pin 32 that is secured to a fixed support, and which engages within a slot 33 formed in the member 34. The member 34 in this instance forms the connecting means between the band and the spring 29. It will be noted that the freedom and the pull of spring 29 are in a direction tangential with respect to the periphery of the wheel 23.

The operating rod 27 and that end of the band attached to the same, is urged toward brake engaging position by tension spring 36. This spring has its one end secured to a fixed support and its other end attached to the arm 37, which in turn is mounted upon rod 27. The direction of pull of the spring 36 applies a force component tangential to the wheel 23, and also a component tending to urge the pivotal connection 28 toward the wheel.

As previously mentioned the braking means for the wheel 24 is the same as for wheel 23. The common operating means for the two braking means can consist of a shaft 41 connected to suitable electrical motive means, such as a solenoid of the rotary type (not shown). The two arms 42 are attached to shaft 41, and have openings in their free ends to loosely accommodate the operating rods 27. Both rods 27 are threaded to accommodate the stop nuts 43. Between each stop nut and the corresponding arm 42, suitable spacing means is inserted, such as the collar 44 and the washer 46.

Each rod 27 is held against displacement by suitable means such as the finger or tab 47. This finger is carried by the mounting panel, and confines the corresponding rod 27 to movement in a restricted space extending between the finger and the panel, whereby the rod in turn maintains its associated brake band properly tracked upon the corresponding brake drum.

The solenoid or other motive means attached to the shaft 41, when energized, serves to rotate the arms 42 in a counterclockwise direction as viewed in Figure 2. When deenergized rotation of the arms in a clockwise direction is limited by suitable stop means, such as the stop pin 48. In Figure 2 it is assumed that the turntables are at rest and that the solenoid attached to shaft 41 is deenergized. Both bands 26 are pulled by the stronger springs 29 to the limiting positions established by pins 32, and both rods 27 are free with respect to arms 42.

Figure 5:
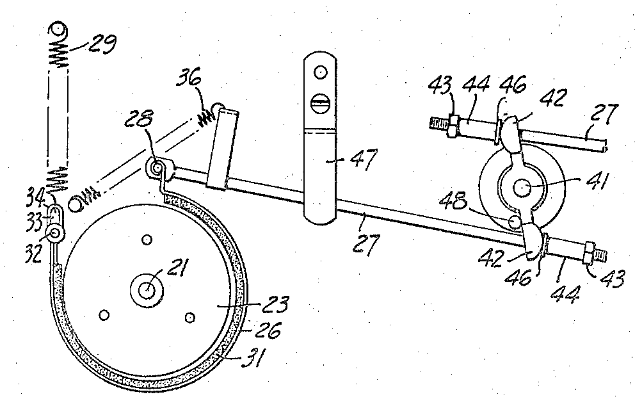
Figure 5 is a view illustrating the manner in which the braking means is released during normal operation.

Operation of the braking means described above is as follows: When the motors are being energized for recording or reproducing operations, proper tape tensions are maintained by the manner in which the motors connected to the turntables 11 and 12, are energized. In other words, during record operations the motor connected to the takeup turntable drives the same to wind up the tape being supplied from the driving capstan 14, and the motor connected to the supply turntable 11 is energized whereby it applies torque in a direction to maintain tape tension for that portion of the tape extending from the supply reel to the driving capstan 14. This likewise applies to periods of operation when the tape is moving at a rapid speed, as for example for faster forward movement of the tape, or for rewind back upon the supply turntable. Under all such operating conditions the solenoid attached to the shaft 41 is energized, whereby both brake bands 26 are released by the pull on rods 27, as shown in Figure 5.

Figure 4:
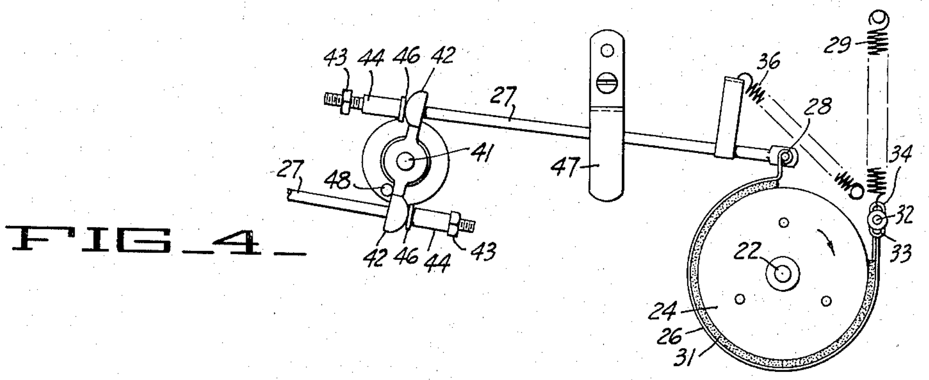
Figure 4 is a view illustrating the braking action for the takeup turntable at the end of a rewind operation.

When the motors are deenergized after a fast forward or rewind operation braking effort is applied to slow down and stop the turntables in such a manner as to avoid the formation of tape loops. It is necessary for the braking force applied to the turntable from which the tape is being removed (i. e. the trailing turntable) to be greater than the braking force acting on the turntable winding up the tape (i. e. the leading turntable). The difference in braking torque must not be sufficient to cause deformation or breakage of the tape. Assuming now that a rewinding operation has been carried out, and that the motors have just been deenergized, it is necessary to brake both the wheels 23 and 24 of Figure 2 against rotation in a clockwise direction. Referring particularly to that band engaging the wheel 23 (corresponding to the tape supply reel), the band tends to rotate with this wheel but is stopped by engagement with the pin 32. Thereafter the braking torque is determined by the friction between the brake drum and the band, and the tension maintained by the weaker spring 36. The frictional force developed on the brake band by the rotating drum is in a direction which opposes the force supplied by the spring, and therefore the brake is self deenergizing or self relieving. The brake band associated with drum 24 likewise engages at the same time that the band engages drum 23, to exert braking effort. However in this intsance the brake band tends to rotate against the tension of spring 29, instead of against the tension of spring 36. This spring exerts considerably more tension than the spring 36, and therefore a greater braking torque is applied. As shown in Figure 4, it will be noted that after rotation of the band 26 for the brake drum 24 has been arrested by the corresponding stop nut 43, the pin 32 occupies an intermediate position within the slot 33. Thus the stronger tension spring 29 acts directly upon the brake band. Here again the brake is self relieving.

After a fast forward movement of the tape, the operation is the same as explained above. However in this instance the greatest braking torque is applied to the brake drum 23, whereas the brake band for the drum 24 has a braking effort determined by the weaker spring 36.

As previously mentioned during all normal operation of the apparatus, the solenoid attached to the shaft 41 is energized whereby rods 24 are positioned (Figure 5) to disengage both the bands from frictional engagement with the associated brake drums.

It will be evident from the foregoing that we have provided a relatively simple brake mechanism capable of performing all of the functions necessary to prevent tape slack when the driving motors are deenergized. Because of the self relieving action the braking effort is applied smoothly and with a predetermined amount of torque, thus avoiding excessive tape tension such as might cause breakage or deformation. Although the braking means for the two turntables are similar in construction, they automatically apply different braking torques whereby the trailing turntable is always braked with a torque greater than that applied to the leading turntable.

I claim:

1. In a magnetic tape apparatus of the type having two turntables adapted to mount supply and takeup reels together with motive means to drive the turntables for normal movement of the tape from the supply to the takeup reel or for rapid rewind or rapid forward movement of the tape; braking means for one of said turntabels comprising a brake drum mounted to rotate with the associated turntable, a brake band extending about the periphery of the drum and having a friction surface for engaging the drum, a brake operating member attached to one end of the band, spring means for urging said one end of the band in a direction to tighten the band about the drum, lost moton means connecting the other end of the band to a fixed support, said lost motion means forming abutment stop means, separate spring means attached to the other end of the band and serving to urge the band in a direction to tighten the same about the drum and to urge said other end against said abutment stop means, means for moving the operating member in a direction to disengage the band with respect to the drum, and abutment stop means for limiting the movement of said operating member in an opposite direction, one or the other of the abutment stop means being engaged depending upon the direction of rotation of the drum.

2. In magnetic tape apparatus of the type having two turntables adapted to mount supply and takeup reels, together with motive means to drive the turntables for normal movement of the tape from supply to takeup reel or for rapid movement of the tape for rapid forward or rewind movements of the tape; braking means for said turntables including braking drums mounted to rotate with the turntables, a brake band extending about the periphery of each brake drum and having a friction surface for engaging the drum, a pair of brake operating members, means serving to attach one end of each band to a corresponding brake operating member, spring means for each brake band serving to urge said one end of a band in a direction to tighten the band about the associated drum, lost motion means serving to attach the other end of each of the bands to a fixed support whereby said other end of each band has limited freedom of movement in opposite directions generally tangential to the associated brake drum, said lost motion means forming abutment stop means, spring means associated with the other end of each of the bands for urging the same in a direction to tighten the associated band about the brake drum, common means attached to said operating members for moving the same in opposite directions to release both of the brake bands with respect to the associated brake drums, and means forming limiting abutment stop means for movements of said operating members in directions opposite to the movements imparted to the same by said operating means, said first named springs being adapted to apply less force than said second named springs.

3. Braking means for magnetic tape apparatus of the type having a turntable serving to mount a magnetic tape reel, comprising a brake drum mounted to rotate with the turntable, a brake member extending about a portion of the drum and frictionally engaging the periphery of the same, two springs operatively connected to said member, the two springs acting independently and in opposition to urge the brake member against the drum, movement of the brake member in either direction about the axis of the drum being opposite to the urge of one or the other of said springs, two abutment stop means for arresting movement of said brake member about the axis of the drum, one or the other of the two abutment stop means being engaged depending upon the direction of rotation of the drum and the stops being so located that the brake member may move a limited amount about the axis of the drum between the limits imposed by the stop means in response to rotation of the drum in opposite directions, and brake control means operatively connected to said brake member to selectively release braking engagement of said member with the drum.

4. Braking means for magnetic tape apparatus of the type having a turntable serving to mount a magnetic tape reel, comprising a brake drum mounted to rotate with the turntable, a brake band extending about a portion of the drum and frictionally engaging the periphery of the same, two springs operatively connected to the ends of the band, the two springs acting independently and in opposition to yieldably urge the ends of the band in tangential directions, movement of the band in either direction about the axis of the drum being opposite to the urge of one or the other of said springs, two abutment stop means for arresting movement of the band about the axis of the drum, each stop means serving to limit the movement of a corresponding end of the band, one or the other of the two abutment stop means being engaged depending upon the direction of rotation of the drum and the stops being so located that the brake member may move a limited amount about the axis of the drum between the limits imposed by the stop means in response to rotation of the drum in opposite directions, and brake control means operatively connected to one end of the band to selectively release braking engagement of the band with the drum.

References Cited in the file of this patent

UNITED STATES PATENTS

| | | |
|---|---|---|
| 1,712,949 | Cataline | May 14, 1929 |
| 1,716,879 | Dworsky | June 11, 1929 |
| 1,875,111 | Nieman | Aug. 30, 1932 |
| 1,996,815 | Kimpton et al. | Apr. 9, 1935 |
| 2,625,337 | Williams | Jan. 13, 1953 |